US010756575B2

(12) United States Patent
Xin et al.

(10) Patent No.: US 10,756,575 B2
(45) Date of Patent: Aug. 25, 2020

(54) WIRELESS POWER TRANSFER SYSTEMS AND METHODS ALONG A PIPE USING FERRITE MATERIALS

(71) Applicant: University of Houston System, Houston, TX (US)

(72) Inventors: Xiyao Xin, Spring, TX (US); Ji Chen, Houston, TX (US); David R. Jackson, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 226 days.

(21) Appl. No.: 15/749,637

(22) PCT Filed: Aug. 3, 2016

(86) PCT No.: PCT/US2016/045308
§ 371 (c)(1),
(2) Date: Feb. 1, 2018

(87) PCT Pub. No.: WO2017/024012
PCT Pub. Date: Feb. 9, 2017

(65) Prior Publication Data
US 2018/0233277 A1 Aug. 16, 2018

Related U.S. Application Data

(60) Provisional application No. 62/200,284, filed on Aug. 3, 2015.

(51) Int. Cl.
*H01F 27/42* (2006.01)
*H01F 37/00* (2006.01)
(Continued)

(52) U.S. Cl.
CPC .............. *H02J 50/10* (2016.02); *H01F 27/28* (2013.01); *H01F 27/365* (2013.01); *H01F 38/14* (2013.01); *H02J 5/005* (2013.01)

(58) Field of Classification Search
CPC ........ H01F 38/14; H01F 27/28; H01F 27/365; H02J 5/005; H02J 50/10; H02J 17/00
See application file for complete search history.

(56) References Cited

U.S. PATENT DOCUMENTS 7,046,009 B2 * 5/2006 Itskovich ................. G01V 3/28
324/338
8,353,352 B2 1/2013 Leitch
(Continued)

FOREIGN PATENT DOCUMENTS

WO WO-2011087400 A1 7/2011
WO WO-2014035785 A1 3/2014

OTHER PUBLICATIONS

Xin et al. "Wireless Power Transmission for Oil Well Applications" (Year: 2013).*
(Continued)

*Primary Examiner* — Rexford N Barnie
*Assistant Examiner* — Rasem Mourad
(74) *Attorney, Agent, or Firm* — Winstead PC

(57) ABSTRACT

A wireless power transfer system may provide coils that are respectively position on upper and lower ends of a pipe to allow power to be wirelessly transferred. Additionally, the system may also provide a soft ferrite layer placed on the upper and lower pipe sections to enhance the magnetic coupling so that the wireless power transfer efficiency can be maintained at a sufficient level when the coil separation is relatively large. Notably, this ferrite layer may span most or the entirely of the region between the coils to further enhance performance. In some cases, a ferrite core may be position between the coils and the pipe as well. In some cases, the pipe may include a tool section that may be non-conductive or results in a discontinuity in the ferrite
(Continued)

layer. However, the setup of the system allows power to be wirelessly transferred despite such discontinuity.

16 Claims, 17 Drawing Sheets

(51) Int. Cl.

| | | |
|---|---|---|
| *H01F 38/00* | (2006.01) | |
| *H02J 50/10* | (2016.01) | |
| *H01F 27/36* | (2006.01) | |
| *H01F 38/14* | (2006.01) | |
| *H01F 27/28* | (2006.01) | |
| *H02J 5/00* | (2016.01) | |

(56) References Cited

U.S. PATENT DOCUMENTS

| | | | |
|---|---|---|---|
| 8,598,743 B2 | 12/2013 | Hall et al. | |
| 2008/0150472 A1* | 6/2008 | Tsai | H02J 7/00 |
| | | | 320/101 |
| 2009/0267452 A1 | 10/2009 | Abdallah | |
| 2010/0062267 A1* | 3/2010 | Karmazin | B32B 18/00 |
| | | | 428/446 |
| 2010/0097065 A1* | 4/2010 | Itskovich | G01V 3/28 |
| | | | 324/336 |
| 2010/0213942 A1 | 8/2010 | Lazarev | |
| 2012/0173196 A1* | 7/2012 | Miszewski | E21B 47/022 |
| | | | 702/151 |
| 2014/0090898 A1 | 4/2014 | Moriarty et al. | |

OTHER PUBLICATIONS

Pan et al. "Investigation of Wireless Power Transfer, Houston: Department of Electrical and Computer Engineering, University of Houston, 2009" (Year: 2009).*

A. Kurs, A. Karalis, R. Moffat, J. D. Joannopoulos, P. Fisher and M. Soljacic, "Wireless Power Transfer via Strongly Coupled Magnetic Resonances," *Science*, vol. 317, No. 5834, pp. 83-86, 2007.

M. Kesler, "Highly Resonant Wireless Power Transfer: Safe, Efficient and over Distance," WiTricity Corporation, Watertown, MA, 2013.

C. Park, S. Lee, G.-H. Cho and C. T. Rim, "Innovative 5-m-Off-Distance Inductive Power Transfer Systems With Optimally Shaped Dipole Coils," *IEEE Transactions on Power Electronics*, vol. 30, No. 2, pp. 817-827, 2015.

X. Xin, D. R. Jackson, J. Chen and P. Tubel, "Wireless Power Transfer for Oil Well Applications," in 2013 IEEE International Symposium on Electromagnetic Compatibility (EMC), Denver, 2013.

K. E. Koh, T. C. Beh, T. Imura and Y. Hori, "Impedance Matching and Power Division Using Impedance Inverter for Wireless Power Transfer via Magnetic Resonant Coupling," IEEE Transactions on Industry Applications, vol. 50, No. 3, pp. 2061-2070, 2014.

S.-H. Lee and R. D. Lorenz, "Development and Validation of Model for 95%-Efficiency 220-W Wireless Power Transfer Over a 30-cm Air Gap," IEEE Transactions on Industry Applications, vol. 47, No. 6, pp. 2495-2504, 2011.

J. S. Ho, A. J. Yeh, E. Neofytou, S. Kim, Y. Tanabe, B. Patlolla, R. E. Beygui and A. S. Y. Poon, "Wireless Power Transfer to Deep-Tissue Microimplants," Proceedings of the National Academy of Sciences, vol. 111, No. 22, pp. 7974-7979, 2014.

I.-J. Yoon and H. Ling, "Realizing Efficient Wireless Power Transfer Using Small Folded Cylindrical Helix Dipoles," IEEE Antennas and Wireless Propagation Letters, vol. 9, pp. 846-849, 2010.

L. C. Shen, "Theory of a Coil-Type Resistivity Sensor for MWD Application," The Log Analyst, vol. 32, No. 5, pp. 603-611, 1991.

S. Pan, Investigation of Wireless Power Transfer, Houston: Department of Electrical and Computer Engineering, University of Houston, 2009.

S. Kim, J. S. Ho and A. S. Y. Poon, "Wireless Power Transfer to Miniature Implants: Transmitter Optimization," IEEE Transactions on Antennas and Propagation, vol. 60, No. 10, pp. 4838-4845, 2012.

A. S. Y. Poon, S. O'Driscoll and T. H. Meng, "Optimal Operating Frequency in Wireless Power Transmission for Implantable Devices," in Proceedings of the 29th Annual International Conference of the IEEE EMBS, Lyon, France, 2007.

X. Xin, et al. "Wireless Power Transfer Along Oil Pipe Using Ferrite Materials"; IEEE Transactions On Magnetics, vol. 53, No. 3, Mar. 2017.

* cited by examiner

WIRELESS POWER TRANSFER SYSTEMS AND METHODS ALONG A PIPE USING FERRITE MATERIALS

RELATED APPLICATIONS

This application claims the benefit of U.S. Provisional Patent Application No. 62/200,284 filed on Aug. 3, 2015, which is incorporated herein by reference.

FIELD OF THE INVENTION

This invention relates to wireless power transfer systems and methods. More particularly, to wireless power transfer along a pipe utilizing ferrite materials.

BACKGROUND OF INVENTION

Emerging works done in the area of inductive power transfer has been done using ferrite materials to increase the magnetic coupling. Large ferrite cores with a length of 3 meter were used to build transmitting and receiving coils for wireless power transfer. The dipole coils were wound on ferrite cores with piecewise linear shape. Such shape makes the flux distribution inside the ferrite core become uniform in an average sense, and the flux lines between two parallel dipole coils become more concentrated hence the power transfer efficiency is improved. The efficiency data provided by was promising, but the model is not practical for well applications as the diameter of the well can rarely be as large as 3 meters. Some research has studied the potential approach of adding a cement layer to the oil pipe to form an acoustic waveguide so that acoustic power can transfer along oil pipe wirelessly. The role of the cement layer in is to act as a wave propagating media that concentrate the most of acoustic energy inside of it. Though such approach can concentrate the propagating acoustic power and improve the power transfer efficiency, there may be potential problems of impedance matching between the piezoelectric transducers and the cement layer. Also, the propagating wave energy will suffer from serious reflection if there is a gap or fracture on the cement layer.

Improved wireless transfer systems and methods utilizing ferrite materials are discussed herein.

SUMMARY OF INVENTION

In one embodiment, a wireless power transfer system may include a ferrite layer positioned on a pipe, as well as a transmitter coil and receiver coil positioned respectively at upper and lower regions of the pipe. In some embodiment, the system can transfer power across a tool region or discontinuous region (e.g. production packer) along the oil pipe. It is difficult to apply power across this region due to the obstruction, but the coils are added at both sides of the production packer to deliver electric power via magnetic induction. However, the inducted magnetic field may decay rapidly as the distance between the two coils increases. The soft ferrite layer is introduced on the pipe between the coils, particularly in upper and lower regions, to enhance the magnetic coupling so that the wireless power transfer efficiency can be maintained at a sufficient level when the coil separation is relatively large. These features allow the system to wirelessly transfer power from the transmitter coil to the receiver coil, even when a tool/discontinuous region is present.

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
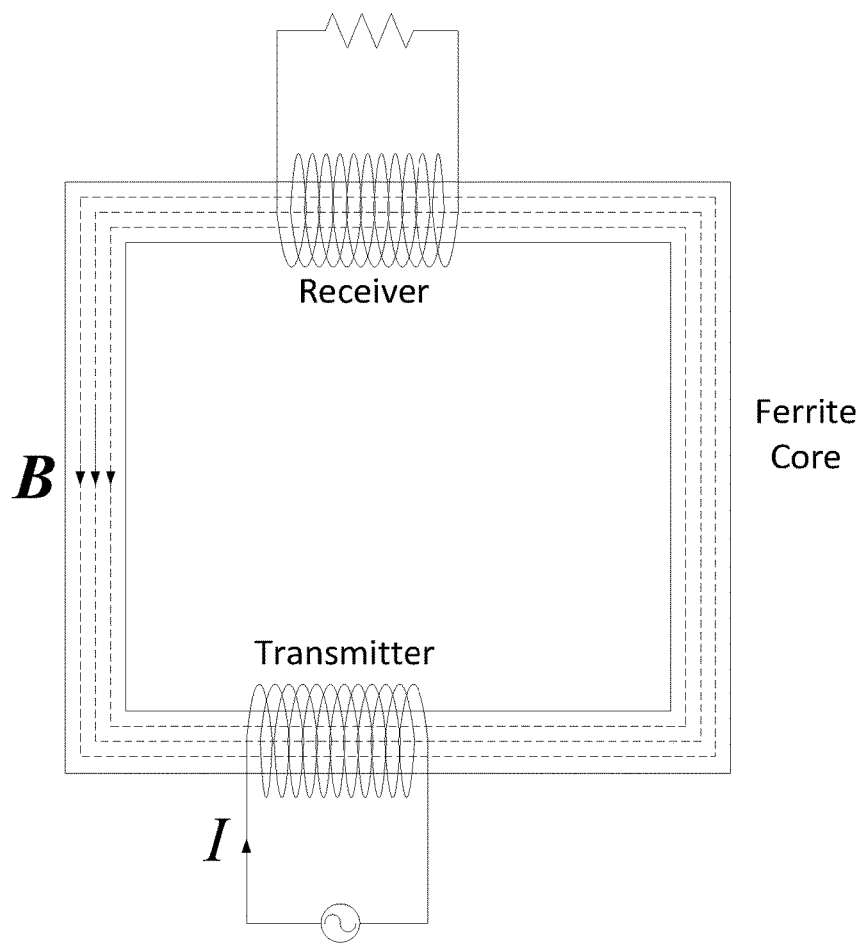
FIG. 1 is an illustrative embodiment of a magnetic circuit with a power transmitter and a receiver.

Refer now to the drawings wherein depicted elements are not necessarily shown to scale and wherein like or similar elements are designated by the same reference numeral through the several views.

Referring to the drawings in general, it will be understood that the illustrations are for the purpose of describing particular implementations of the disclosure and are not intended to be limiting thereto. While most of the terms used herein will be recognizable to those of ordinary skill in the art, it should be understood that when not explicitly defined, terms should be interpreted as adopting a meaning presently accepted by those of ordinary skill in the art.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

In wireless power transfer systems and methods, a ferrite sheet layer may be added onto the pipe/tubular. The ferrite sheet layer not only concentrates the magnetic flux lines, but also acts as the magnetic flux pathway to link the transmitter and the receiver wirelessly. The magnetic flux pathway introduce to our design is actually an open loop magnetic circuit. An example of a magnetic circuit is given in FIG. 1.

The magnetic circuit is formed by a ferrite loop core. The transmitter winded on the core generate external magnetic field which induce magnetic flux distribution inside the magnetic circuit. The magnetic flux in the ferrite core is given by $$\Phi = \frac{F_m}{R_m}. \tag{6-1}$$

The formula given by (6-1) can be regarded as the Ohm's law for magnetic circuit. $F_m$ is the magnetic motion force (magnetic circuit version of electric motion force in Ohm's law) and $R_m$ (unit: A/Wb) is the magnetic resistance. The magnetic resistance of the ferrite core is given by $$R_m = \frac{l}{\mu A}. \tag{6-2}$$

Figure 2:
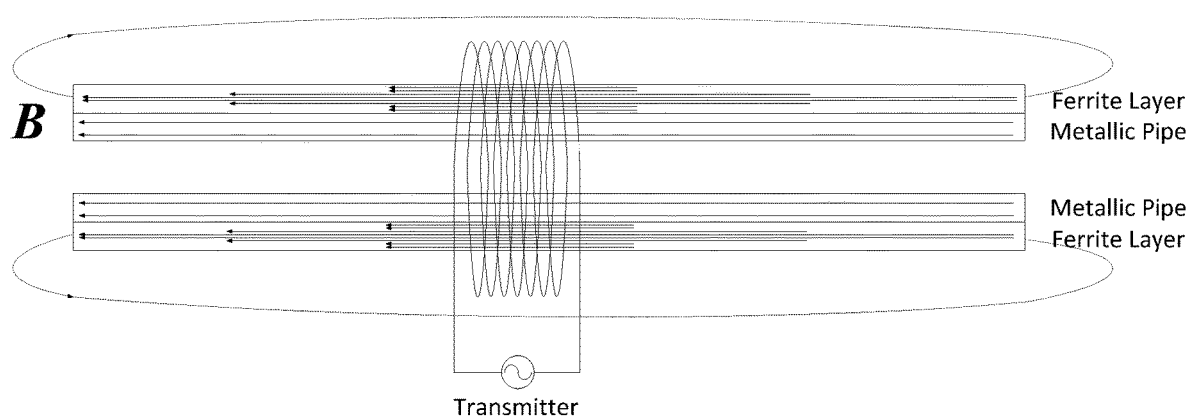
FIG. 2 shows flux density and the open loop magnetic circuit along a pipe.

In (6-2), l is the length of the ferrite core segment, μ is the ferrite permeability, and A is the cross section area of the ferrite core. Therefore, it can be see that given the length of the ferrite segment, the magnetic resistance will be smaller with a larger material permeability for cross section area. These two aspects are crucial to this design. Applying the ferrite layer onto the oil pipe, an open loop magnetic circuit is obtained as shown in FIG. 2.

Figure 3:
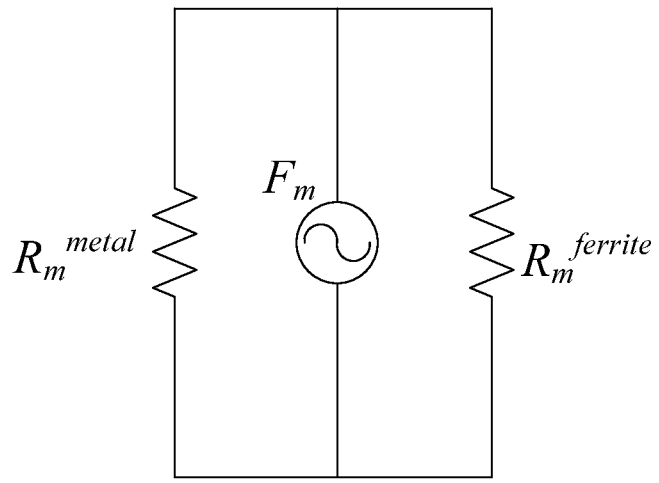
FIG. 3 shows an analogous parallel electric circuit model for ferrite layer and metallic pipe structure.

If the ferrite material layer does not form a closed loop pathway, the magnetic flux distribution inside the ferrite material will not be as uniform. The magnetic flux density will reach its maximum at the location of the transmitter and will reach minimum the ends of the ferrite layer sections. But still, due to the low magnetic resistance of the ferrite material, more magnetic flux was concentrated along the metallic pipe. The time varying magnetic flux carries the reactive magnetic energy. If another receiving coil is added anywhere on the ferrite layer, the reactive magnetic energy could be harvested via magnetic induction. The efficiency of the power transfer will depend on the flux density strength of the location. As the flux density will drop drastically at the ends of the ferrite layer, either the receiver is kept away from the ferrite section ends or the coverage of the ferrite sheet layer is enlarged in order to obtain as long power transmitting distance as possible. In well applications, the pipe could be a ferromagnetic metal as well. In this case, the pipe and the ferrite layer structure are analogous to the parallel electric circuit shown in FIG. 3.

The ferromagnetic metal pipe will also have relatively low magnetic permeability and there will be certain amount of magnetic flux leaked into the metal pipe. The magnetic flux inside the metal pipe will be counteracted by the inverse magnetic field induced by the eddy current effect as the operating frequency increase. Therefore, it is desired to reduce the flux leak to the metallic pipe as much as possible. In order to do this, the magnetic resistance of the ferrite layer should be decreased by using materials with higher permeability or by increase the thickness of the ferrite layer. The flux distribution and the thickness adjustment of the ferrite material layer is shown with more details in the subsequent discussion of FEM Simulation.

Model of Wireless Power Transfer with Ferrite Layer

As a nonlimiting example, systems and methods discussed herein may discuss oil pipes or wells. However, it shall be understood that other embodiments of the wireless transfer systems and methods may be applied for any other suitable wells.

Figure 4:
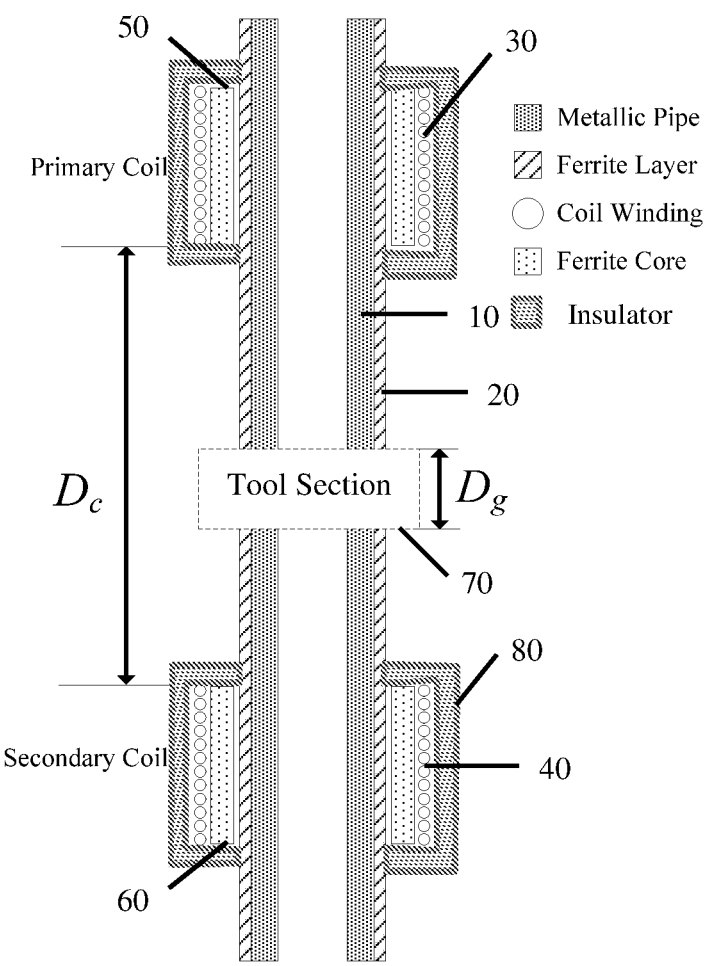
FIG. 4 shows a wireless power transfer model with soft ferrite sheet.

A nonlimiting example of wireless power transfer system is shown in FIG. 4. Based on the discussion above, a wireless power transfer system and method may be provided by positioning or covering a pipe 10 with a ferrite layer 20 comprising a soft ferrite material. As a nonlimiting example, the pipe may be a pipe for an oil well or for any other suitable well, and the soft ferrite material may be coated onto or positioned on the pipe. The ferrite layer 20 annularly surrounds pipe 10. The pipe 10 may provide an upper region capable of receiving power, such as from a power supply at the surface, and a lower region where it is desirable to receive power for downhole tools, sensors, or the like. In some embodiments, the ferrite layer or ferrite sheet layer 20 may be continuous or non-continuous. In some embodiments, the system may include a tool section 70 where a downhole tool is provided, such as a production packer, sensor(s), or any other downhole tools. In some cases, the tool section 70 may result in a discontinuity that changes conductivity or magnetism, and in extreme cases, may result in a non-conductive or non-magnetic section. For example, the pipe 10, ferrite layer 20, or both may be absent from the tool section 70. As a nonlimiting example, the tool section may provide a tool, such as a production packer. As a result, the soft ferrite material 20 may cover the upper and lower regions above and below the production packer, but the ferrite layer 20 may be absent from the tool section 70 where the production packer is positioned. Notably the ferrite layer 20 spans a length of pipe 10 that is greater than the length spanned by the primary 30 and secondary 40 coils. In some embodiments, the ferrite sheet layer 20 may be made continuous by customizing a downhole tool (e.g. production packer) to include a ferrous sheet layer. In some embodiments, the ferrite sheet layer 20 may be separated a gap with a distance $D_g$. As a nonlimiting example, a production packer separates the top and bottom regions by an axial distance $D_g$ to provide the gap. In some embodiments, the ferrite sheet layer 20 may be a soft ferrite material with high permeability, which may allow a magnetic pathway to be formed along the pipe 10 that covers a region around the packer. In some embodiments, the ferrite sheet layer 20 may be a material where the magnetic polarization of the material molecules can be easily changed by external magnetic field or a material with a low coercivity. Coercivity is the strength of the applied magnetic field that reduces the magnetization of the material to zero. Nonlimiting examples of suitable ferrous material for the ferrite sheet layer may include sintered ferrite sheets or ferrite materials that can be coated, sprayed, painted, or placed on a pipe. In some embodiments, the thickness of the layer may be 0.3 mm or greater. In some embodiments, the thickness of the layer may be 0.5 mm or greater. In some embodiments, the thickness of the layer may be 0.9 mm or greater. It is believed that increased thickness improves power transfer efficiency.

The wireless transfer system may further provide a primary/transmitter coil 30 disposed or positioned around the pipe 10 and ferrite layer 20 in the upper region, and a secondary/receiver coil 40 disposed or positioned around the pipe 10 and ferrite layer 20 in the lower region. In some embodiments, the primary coil 30 and secondary coil 40 may be separated by a coil separation $D_c$. A power supply may provide power and the primary coil 30 may receive power from the power supply, such as one provided at a surface of a well. The secondary coil 40 may wirelessly receive power transmitted by the primary coil 30. As noted previously, it may be desirable to provide a tool section 70 that may interrupt continuity of the pipe 10, ferrite layer 20, or both, such as to provide tool(s) aid various well activities (e.g. isolating section(s) of the well, fracturing, acidizing, well testing, etc.). As such, the primary coil 30 may be positioned above the tool section 70, and the secondary coil 40 may be positioned below the tool section in some embodiments to necessitate such well activities. In some embodiments, the system may optionally provide ferrite cores 50, 60 for each of the coils 30, 40. Each of the ferrite cores 50, 60 may be positioned annularly between the respective coils 30, 40 and pipe 10/ferrite layer 20. In some embodiments, the ferrite core materials may be soft ferrite and/or materials with a high Curie temperature (e.g. 100° C. or greater). In some embodiments, the entirety of the primary coil 30, secondary coil 40, optional first ferrite core 50, and/or optional second ferrite core 60 may be sealed inside an insulate structure or casing 80 to avoid exposure to the downhole environment, which may cause corrosion or damage. In some embodiments, the pipe gap $D_g$ may be less than 90% the coil separation $D_c$. In some embodiments, the pipe gap $D_g$ may be less than 80% the coil separation $D_c$. In some embodiments, the coil separation $D_c$ is equal to or greater than 1 meter. In some embodiments, the coil separation $D_c$ is equal to or between than 1-3 meters. In some embodiments, the power transfer efficiency is equal to or greater than 5% or greater at a distance of 1 meter. In some embodiments, the power transfer efficiency is equal to or greater than 10% or greater at a distance of 1 meter.

In order to implement such structure in the lab, ferrite sheet products that could easily be installed on and peeled off from the pipe were needed. In this research, a class of commercial products called sintered ferrite sheet was utilized. However, it shall be understood that sintered ferrite sheets are merely a nonlimiting example, and other embodiments, may utilize any suitable soft ferrite material with high permeability. Such ferrite sheet has properties of high permeability (e.g. complex permeability of 100 or greater at a wide range of frequencies) and low loss tangent. The products come with sticky layer so they are easy to install on the metallic pipe. There are several manufactures providing such products like Würth Elektronik, Maruwa Co., Ltd, and Toda Kogyo Corporation. The FLX series of Toda Kogyo Co. was chosen as the material of ferrite layer in simulation. The magnetic property of FLX series is given in Table 1.

TABLE 1

Property of Toda Kogyo FLX Series

| Grade | FLX-950 | FLX-247 | FLX-146 | FLX-221 |
|---|---|---|---|---|
| Material | Ni—Zn—Cu Ferrite | ← | ← | ← |
| Thickness (mm) | 0.05~0.3 | 0.05~0.3 | 0.05~0.3 | 0.05~0.3 |
| µ' @13.56 MHz | 140 | 310 | 380 | 660 |
| Curie Temp. (° C.) | 215 | 210 | 150 | 100 |

It was noticed that for FLX series, the Curie temperature becomes lower as the material permeability is made to be higher. It was important to keep in mind that the wireless power transfer system design could potentially be working in high temperature environment. Therefore, a balance between the permeability and the Curie temperature was important when choosing the appropriate material for ferrite layer. In the following discussion of simulation, we choose FLX-247 as a practical option for the ferrite layer added on the metallic pipe. The sintered ferrite material is effective for concentrating the flux inside the ferrite material. The magnetic shielding sheet 3M 1380 is a nonlimiting example of an alternative material as it is made of magnetic shielding material with large permeability.

FEM Simulation: Continuous Soft Ferrite Layer

In this section, the ferrite layer was added to the metallic pipe in the FEM simulation model, and the improvement brought by this structure is illustrated. The ferrite core of the coils was removed so that the focus is solely on the coupling enhancement of the ferrite layer. Also, the best case scenario is considered in which the ferrite layer is continuous between the transmitter and the receiver. The model for simulation is given in FIG. 5.

The parameter value given by Table 1 were used to setup the material properties in FEM simulation. The layer thickness was set to 0.3 mm for starters and the metallic pipe is made of non-magnetic stainless steel. In simulation, the length of both pipe and ferrite layer was set at 5 meters. The mutual inductance was calculated using an analytical method to compare with FEM simulation results, and the result were in agreement. The FEM simulation result of the mutual inductance is given in FIG. 6.

The analytical model predicts the mutual inductance slightly higher than FEM simulation, but the results are still comparable to each other. At a fixed coil separation, the mutual inductance is positively related to the magnetic permeability. The ferrite sheet FLX221 has the largest magnetic permeability and correspondingly the system with this ferrite layer has the largest mutual inductance given a certain coil separation. It is also expected that the larger ferrite layer permeability will also bring better power transfer efficiency. The FEM result of power transfer efficiency is illustrated in FIG. 7.

Figure 6:
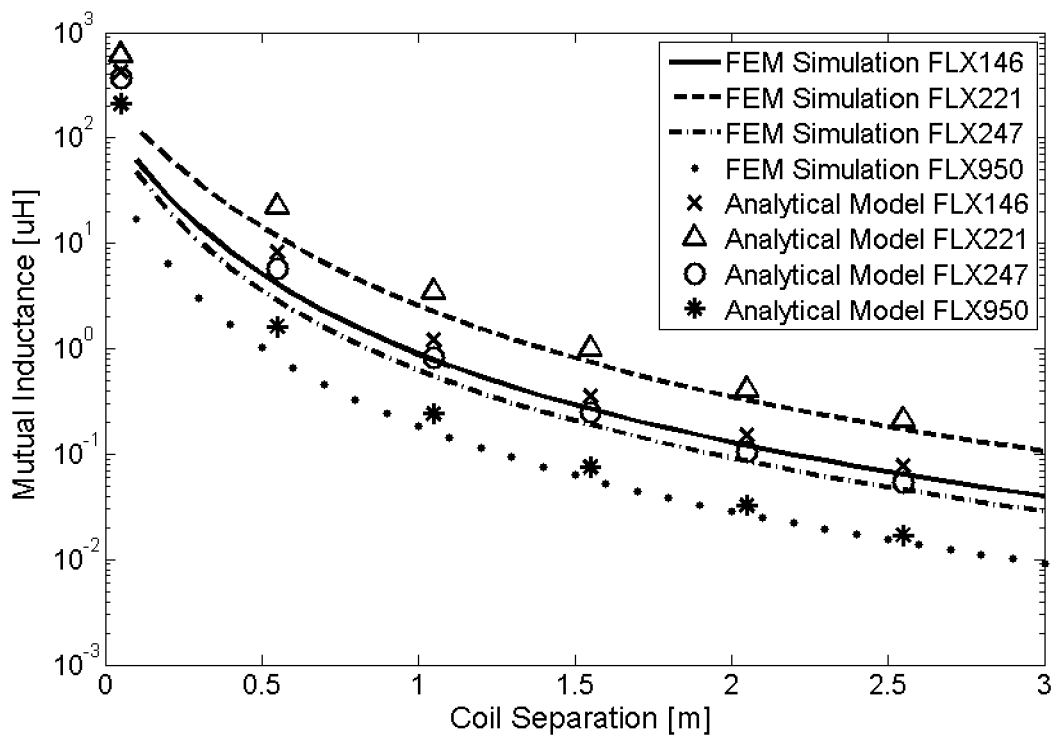
FIG. 6 shows mutual inductance of the system with soft ferrite layer.
Figure 7:
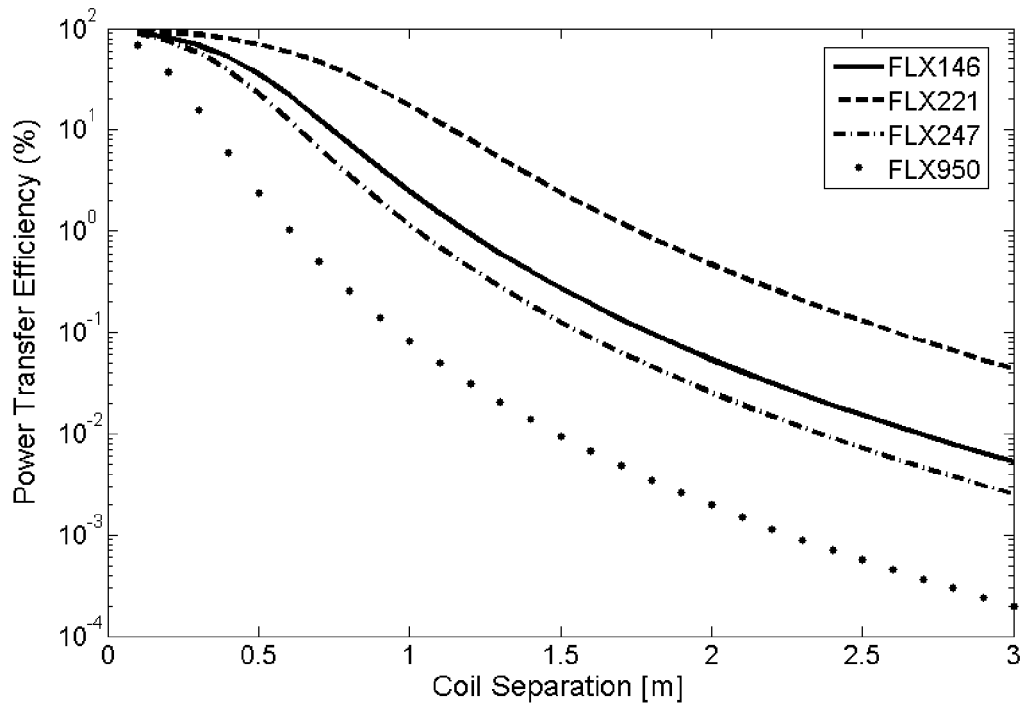
FIG. 7 shows a FEM simulation of power transfer efficiency with the soft ferrite layer.
Figure 8:
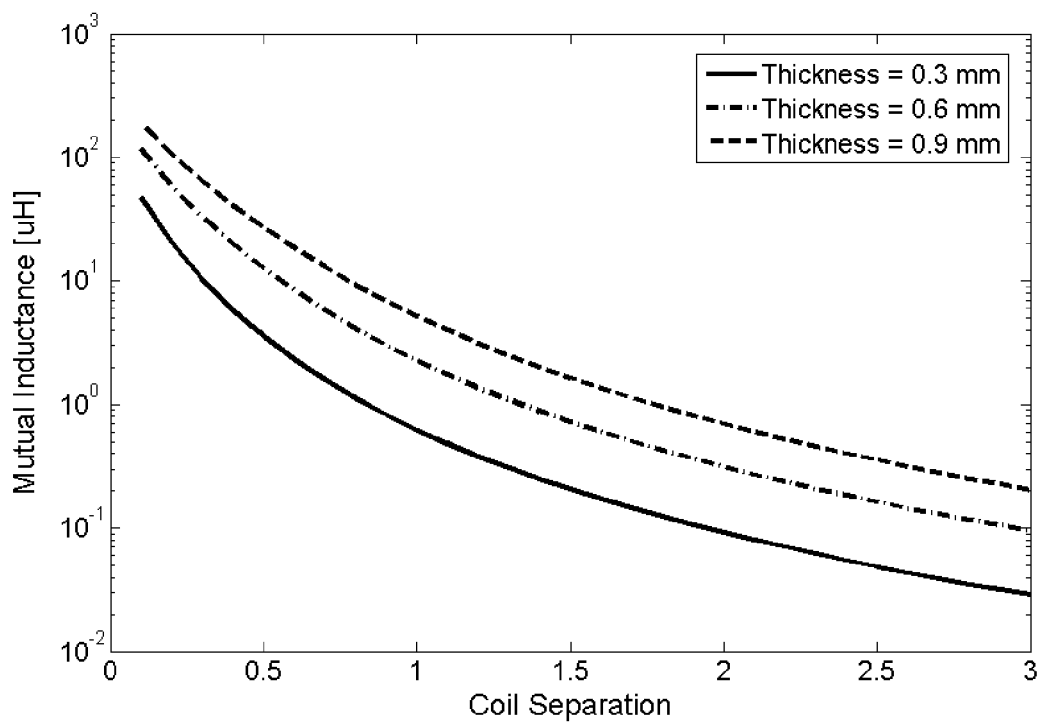
FIG. 8 shows a FEM simulation of mutual inductance with ferrite sheet layer of multiple thicknesses.

Both FIG. 6 and FIG. 7 show that adding soft ferrite layer improves the magnetic coupling and the power transfer efficiency of the wireless power transfer system along the metallic pipe. The ferrite layer is acting like an open ends magnetic circuit, and the magnetic resistance of this layer structure can be lowered not only by increasing the permeability of the material, but also by adding thickness of the layer structure. Using FLX247 as the ferrite layer material, we vary the layer thickness and the mutual inductance of the two coil system along the pipe is given in FIG. 8.

Figure 9:
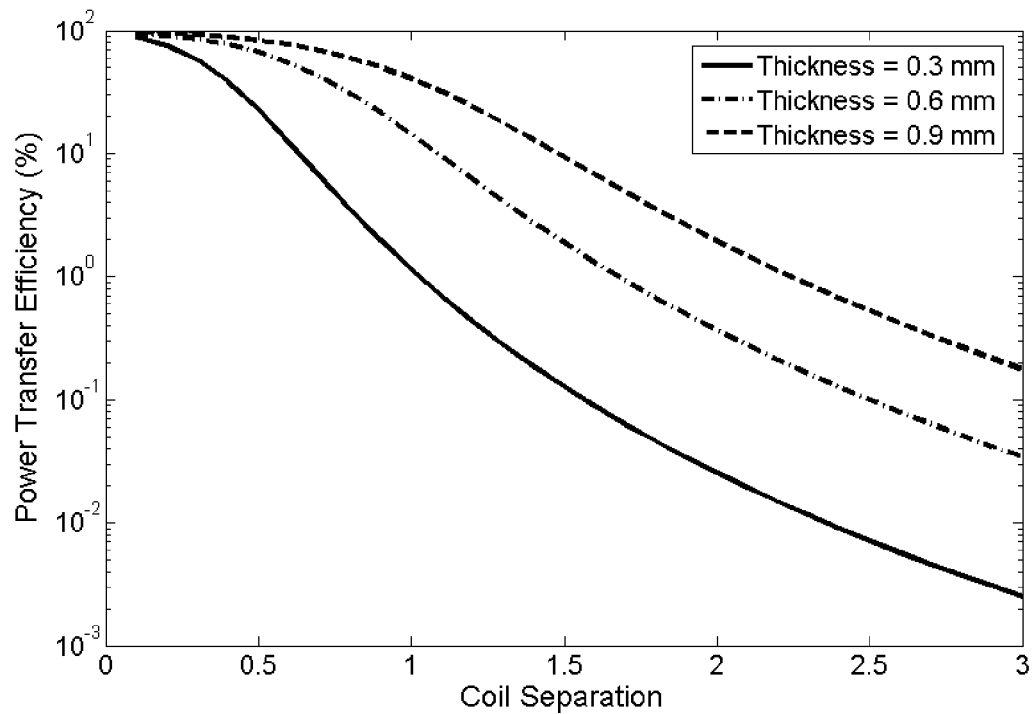
FIG. 9 shows a FEM simulation of power transfer efficiency of the system with soft ferrite layer of multiple thicknesses.

Adding thickness of the ferrite layer enhances the magnetic coupling between the coils. The same could be expected for the power transfer efficiency. The matrix model formula was utilized to predict the optimal power transfer efficiency of the system given a range of coil separation and the simulation results of power transfer efficiency is given in FIG. 9. As a nonlimiting example, the simulation model with a 0.9 mm thick ferrite layer provided a power transfer efficiency of 10% at 1 meter and 0.2% at 3 meters.

Soft Ferrite Layer with a Gap

Figure 10:
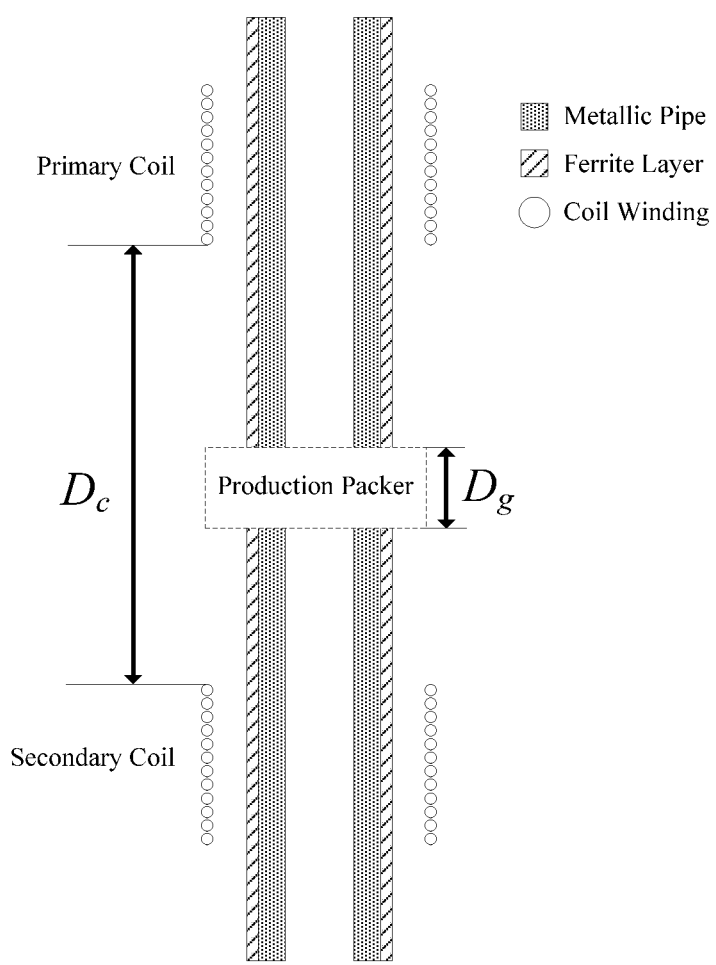
FIG. 10 shows a FEM simulation model with a pipe gap.

In the prior discussion it was assumed that the ferrite layer on the pipe is continuous between the transmitter and the receiver. However in the actual application, it may not be desirable to customize a production packer between the coils to be covered with ferrite layer as well. Therefore, the situation that there is a gap on the ferrite layer should be considered, and the gap structure is modeled in the FEM simulation. Production packers are mostly made of rubber material so it is reasonable for to model a pipe break in simulation as well. The simulation model of the system with a gap is shown in FIG. 10.

In FEM simulation, the coil separation ($D_c$) was set to 1 meter, the gap distance ($D_g$) was varied from 10 cm to 1 meter, and the mutual inductance and power transfer efficiency was calculated. The mutual inductance of the system is shown in FIG. 11.

Given the fixed coil separation of 1 meter, the pipe gap was gradually increased to see the change of the mutual inductance. It was noticed from FIG. 11 that only when the gap length is closing to the 80% of the coil separation will the mutual inductance curves have an obvious decrease. Thus, in some embodiments, the gap length is equal to or less than 80% of the coil separation. In some embodiments, the gap length is equal to or less than 90% of the coil separation. Similarly, simulation was performed to estimate the optimal power transfer efficiency and the results are shown in FIG. 12.

Figure 11:
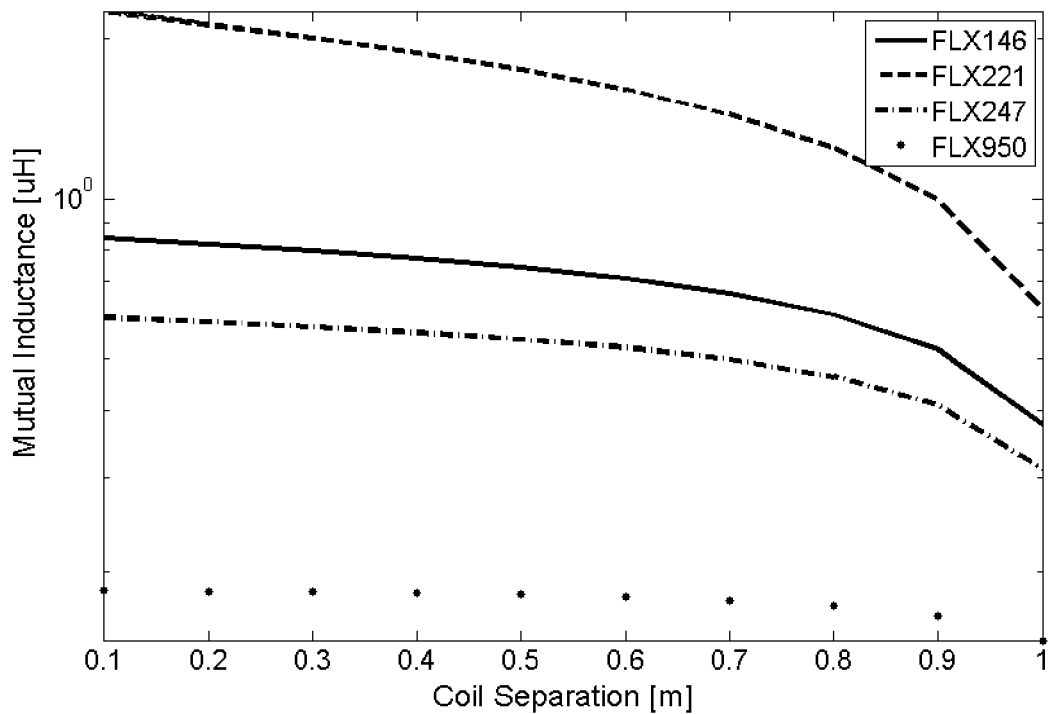
FIG. 11 shows a FEM simulation of mutual inductance with pipe gap variations.
Figure 12:
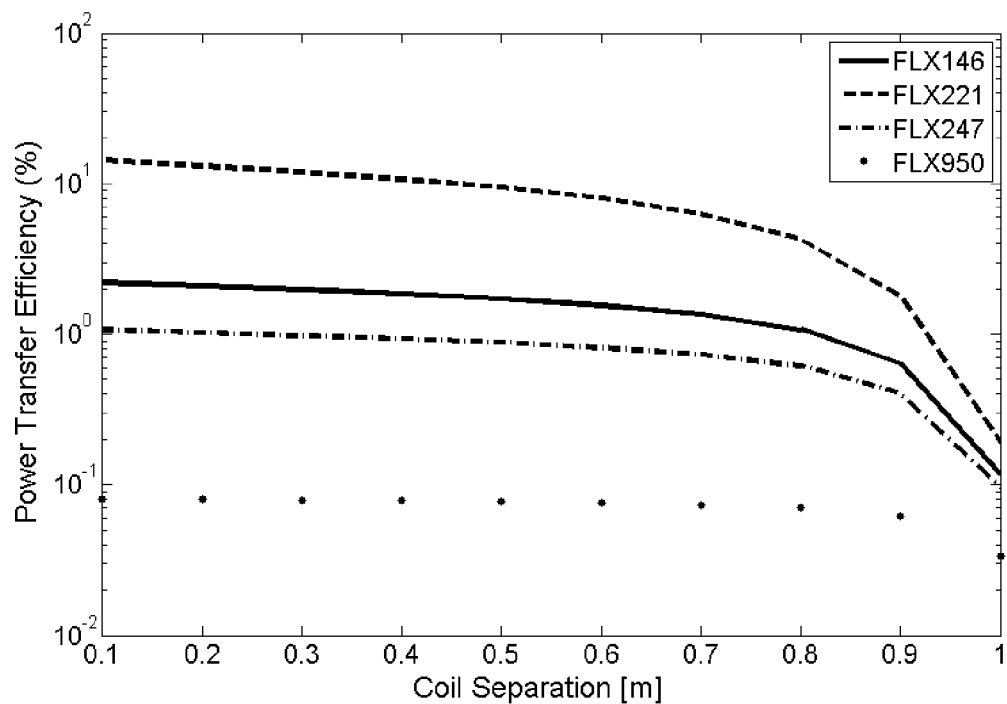
FIG. 12 shows a FEM simulation of power transfer efficiency with gap variations.

Based on the results of FIG. 11 and FIG. 12, it was concluded that the pipe gap will not affect the mutual inductance and power transfer efficiency very much as long as the gap length is small compared to the coil separation. Therefore, the design of system could also be utilized in situations in which the production packer is not customized by covering with soft ferrite layer.

Combining Ferrite Layer and Ferrite Core

It can already be seen that adding ferrite layer on the metallic oil pipe improves the magnetic coupling and power transfer efficiency. The performance of the system may be further improved by adding ferrite cores to the coils. Simulation model of wireless power transfer with ferrite layer and ferrite cores is given in FIG. 13.

Figure 5:
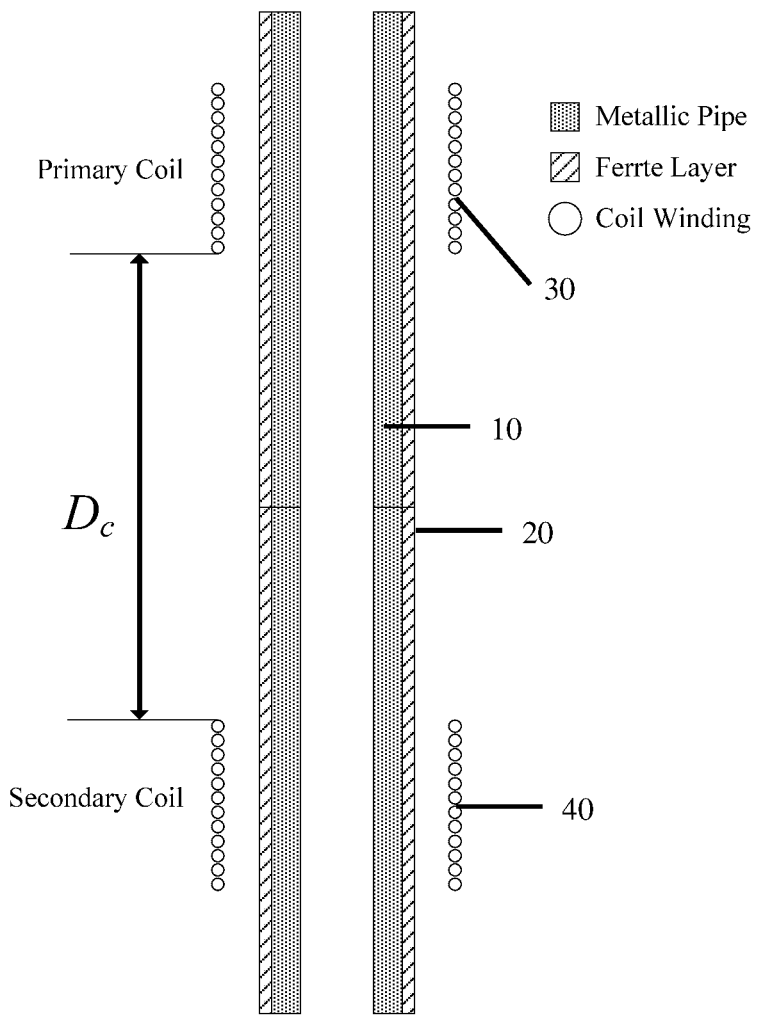
FIG. 5 shows a FEM simulation model with continuous ferrite layer.
Figure 13:
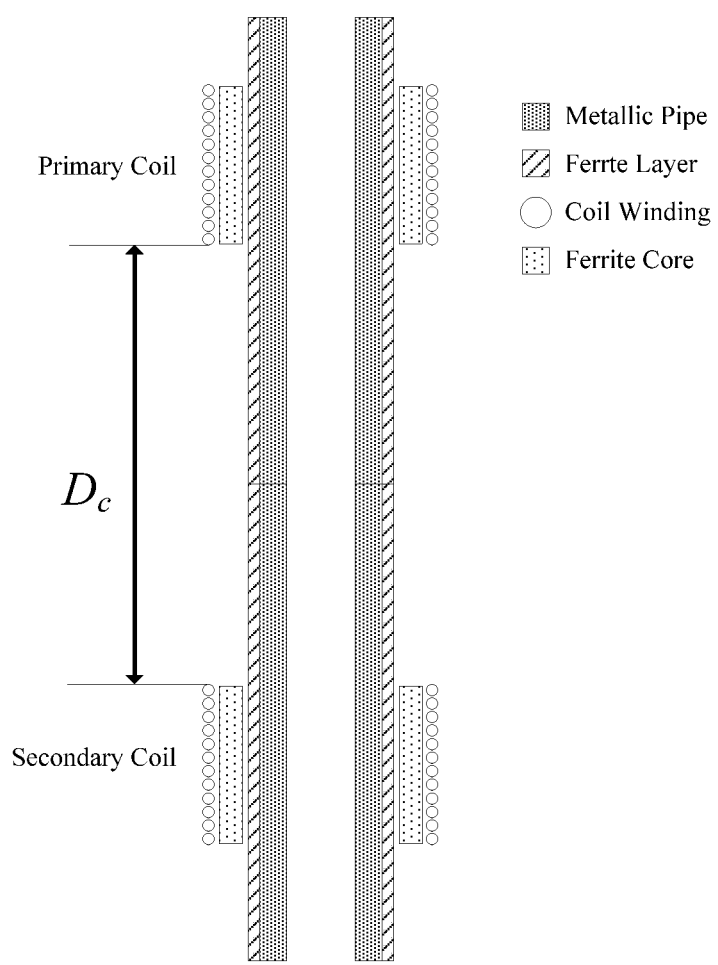
FIG. 13 shows a simulation model of wireless power transfer with ferrite layer and ferrite core.
Figure 14:
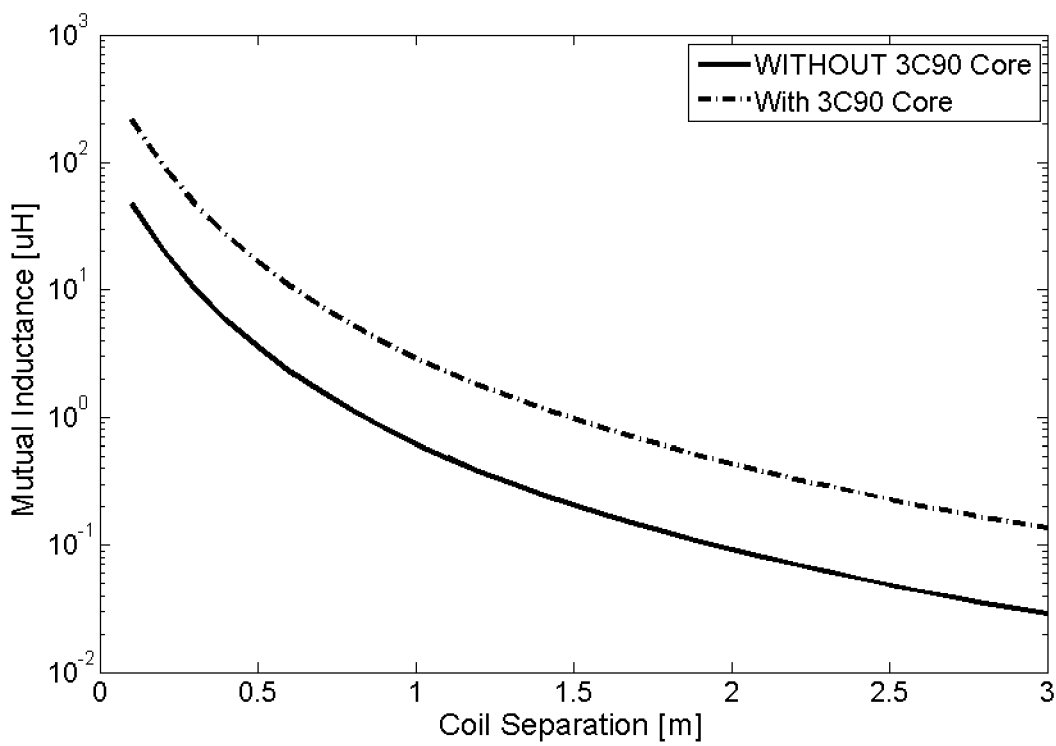
FIG. 14 shows FEM simulation results of mutual inductance along magnetic material coated pipe with or without ferrite cores on the coils.

In FIG. 13, the ferrite layer is continuous on the pipe so that the mutual inductance and power transfer efficiency results can be compared to the model given in FIG. 5. The soft ferrite material for the ferrite layer on the pipe is FLX247 and the ferrite cores on the coils are made of 3C90. The FEM simulation of mutual inductance is given in FIG. 14.

Figure 15:
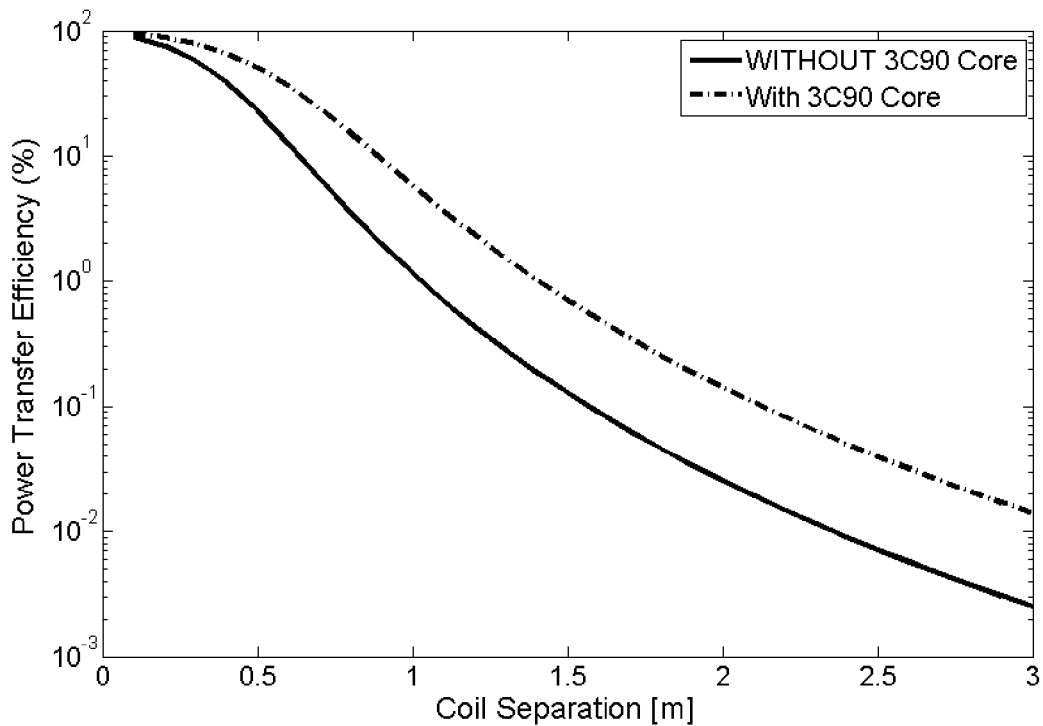
FIG. 15 shows simulation results of power transfer efficiency along ferrite material coated pipe with or without ferrite cores on the coils.

Adding ferrite cores, the magnetic coupling between the coils is improved, as the magnetic cores enhance the magnetic flux link between the transmitter and the receiver. The same improvement may be expected on the power transfer efficiency. The simulation results of optimum power transfer efficiency are given in FIG. 15.

Ferrite Layer with Ferromagnetic Metal Pipe

The pipe metal used in simulation models given in prior discussion is non-magnetic. In actual applications in oil industry, it is possible that the metallic oil pipe is also ferromagnetic, which means the relative permeability ($\mu_r$) of the pipe metal is larger than 1. Though such ferromagnetic property of the metallic pipe might enhance the magnetic flux link between the transmitter and the receiver, the eddy current induced inside the pipe might still be the dominant effect and such improvement of magnetic flux link could be trivial. In this section, the same dimensions of the pipe are kept, but the permeability value of the pipe metal is varied and the change of mutual inductance and power transfer efficiency is explored. The mutual inductance between the transmitter and the receiver is shown in FIG. 16.

Figure 16:
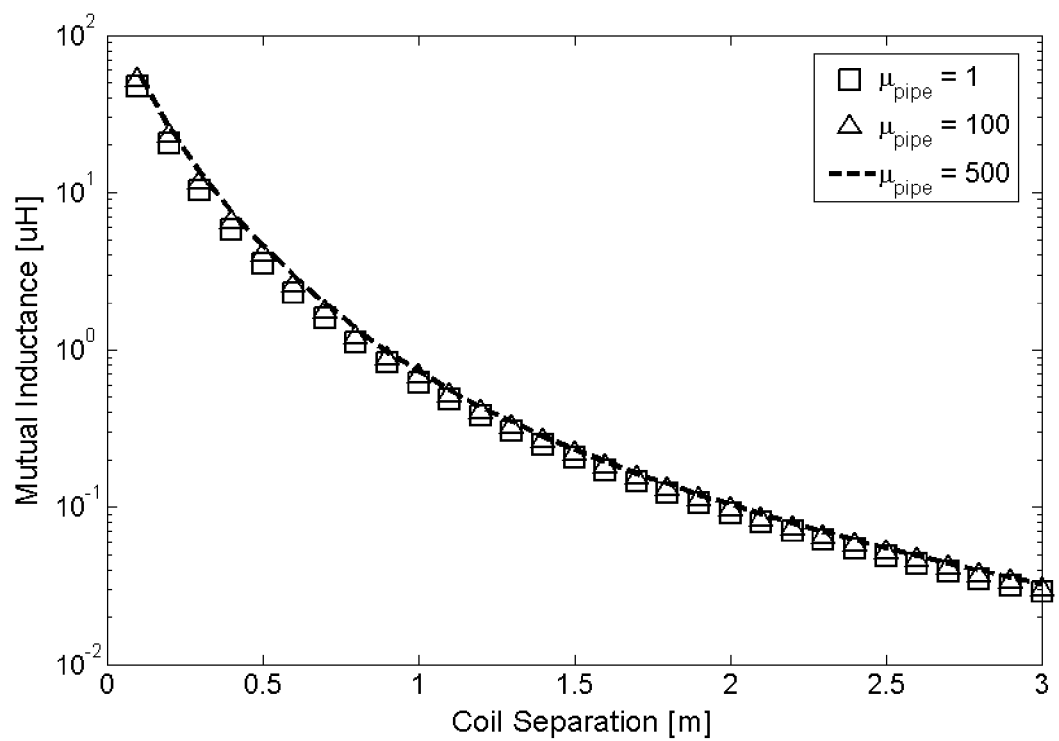
FIG. 16 shows a FEM simulation of mutual inductance with variation of pipe metal permeability.

The results in FIG. 16 show that the mutual inductance of the system doesn't increase significantly while there is an obvious change of the pipe metal permeability. This is because the eddy current induced inside the pipe counteract the additional magnetic flux brought by the ferromagnetic material. However, the simulation results show that the input resistance of the transmitter and the receiver increases with the pipe metal permeability, which is shown in FIG. 17.

Figure 17:
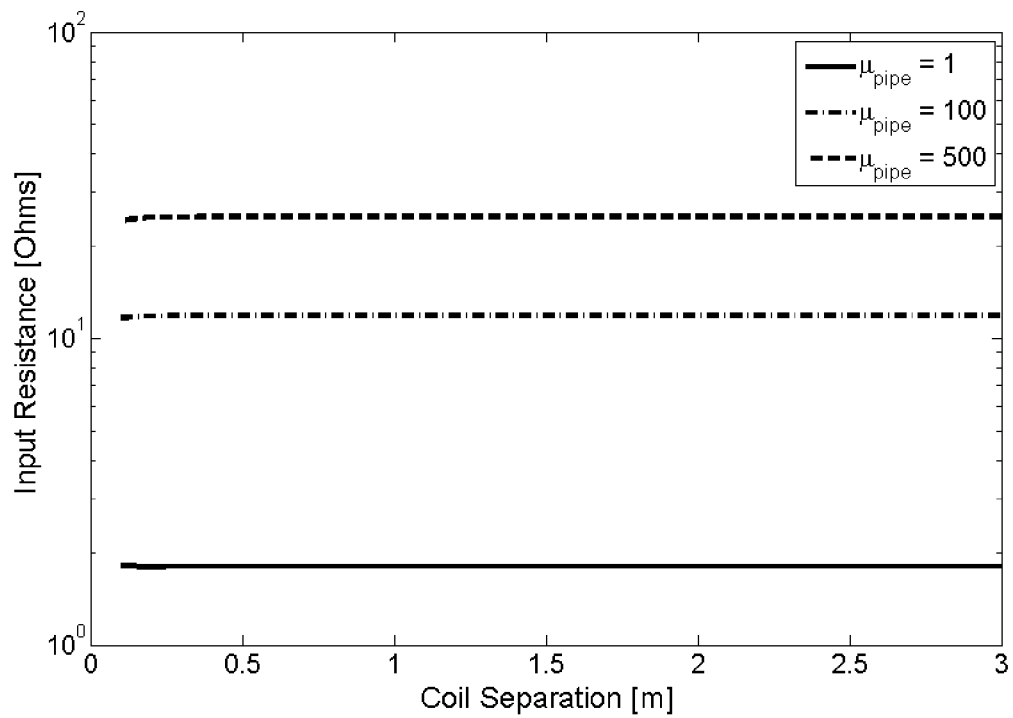
FIG. 17 shows input resistance of the transmitting coil on the metal pipe with variation of pipe metal permeability.
Figure 18:
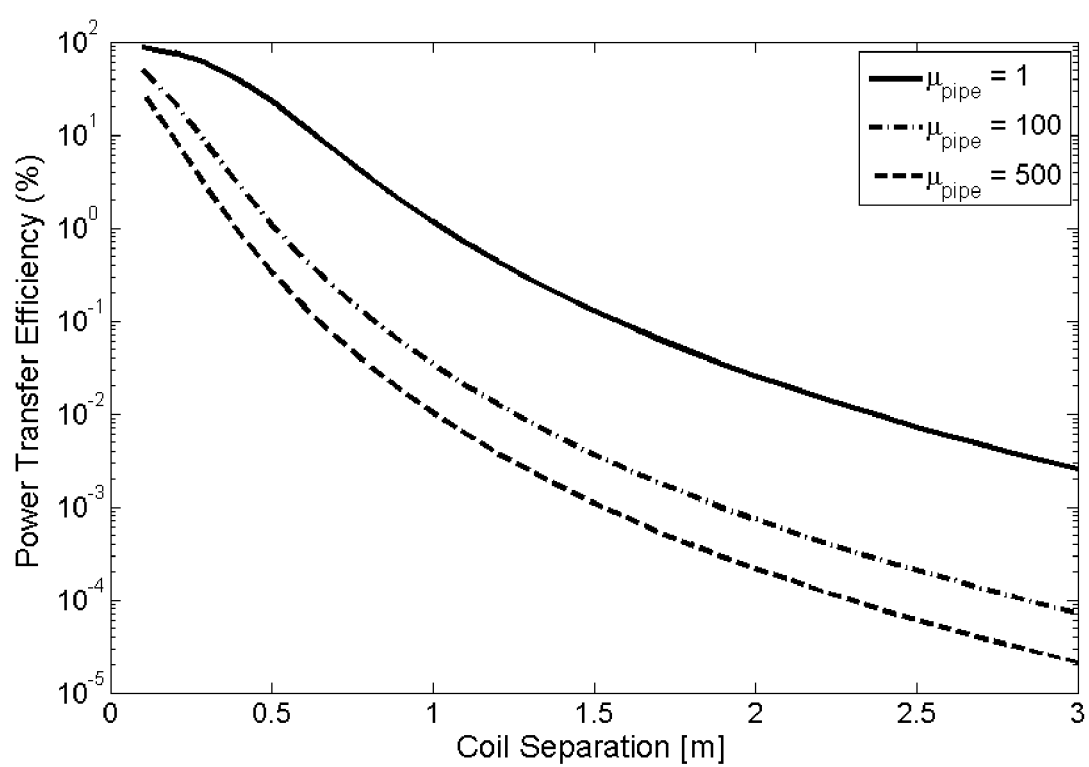
FIG. 18 shows simulation results of power transfer efficiency along metal pipe with variation of pipe metal permeability.

The input resistance data in FIG. 17 show that the input impedance of the transmitter increases with the pipe metal permeability. In the simulation model, the transmitting and the receiving coils are identical and their positions are symmetrical to the center of the metal pipe, so it can be assumed that the input resistance of the receiver is the same as that of the transmitter. Combining the results shown in FIG. 16 and FIG. 17, the power transfer efficiency of the system can be expected to decrease as the permeability of the metal pipe becomes larger. The simulation results of power transfer efficiency are given in FIG. 18.

Figure 19:
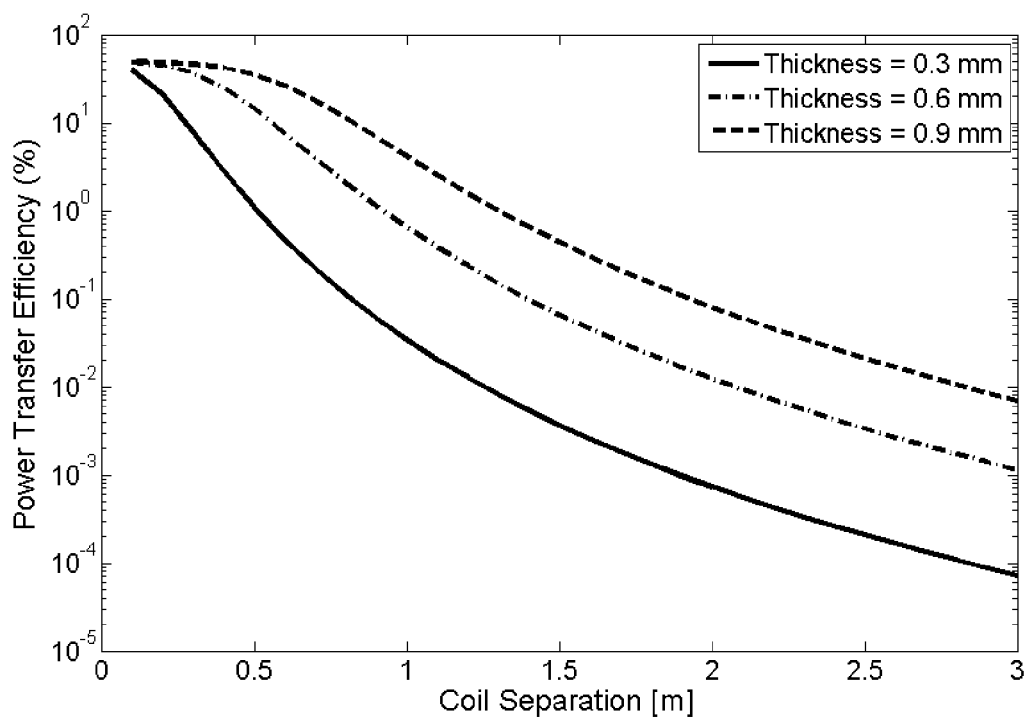
FIG. 19 shows power transfer efficiency along ferromagnetic metal pipe with variation of soft ferrite layer thickness.

The pipe permeability affects the power transfer efficiency negatively. In order to compensate for the increase of input resistance brought by the pipe permeability, the thickness of the soft ferrite layer could be increased to enhance the magnetic coupling while reducing the eddy current effect inside the metallic pipe. While keeping the relative pipe metal permeability as 100, the power transfer efficiency results were plotted from simulation with multiple soft ferrite layer thickness, which is shown in FIG. 19.

The following examples are included to demonstrate particular aspects of the present disclosure. It should be appreciated by those of ordinary skill in the art that the methods described in the examples that follow merely represent illustrative embodiments of the disclosure. Those of ordinary skill in the art should, in light of the present disclosure, appreciate that many changes can be made in the specific embodiments described and still obtain a like or similar result without departing from the spirit and scope of the present disclosure.

Experiment Validation

According to the previous discussion, it can be seen that the improvement brought by ferrite layer on the oil pipe is more obvious on non-magnetic pipe than on ferromagnetic pipe. In this section, the simulation results with ferromagnetic pipes and non-magnetic pipes are also validated in lab. The ferrite layer use in the experiment is made of 3M 1380 ferrite sheet. The permeability of the material is not provided by the manufacturer, but shall be measured.

Measuring Permeability of the Ferrite Sheet Material

Figure 20:
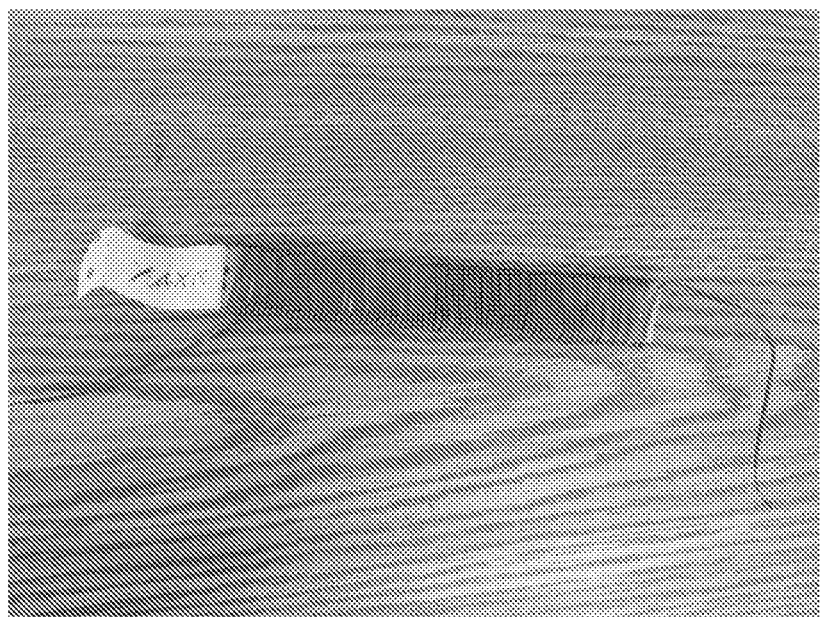
FIG. 20 shows a coil winded on 3M 1380 ferrite sheet sample.

A sample of the ferrite sheet was taken with the shape of narrow rectangular, and the permeability component was measured along the long edge of the rectangular. Two identical samples were bound together to increase the thickness of the sample so that it is easier to wind copper wires on it. A testing coil was wound with the ferrite sheet sample as the core, which is shown in FIG. 20.

Figure 21:
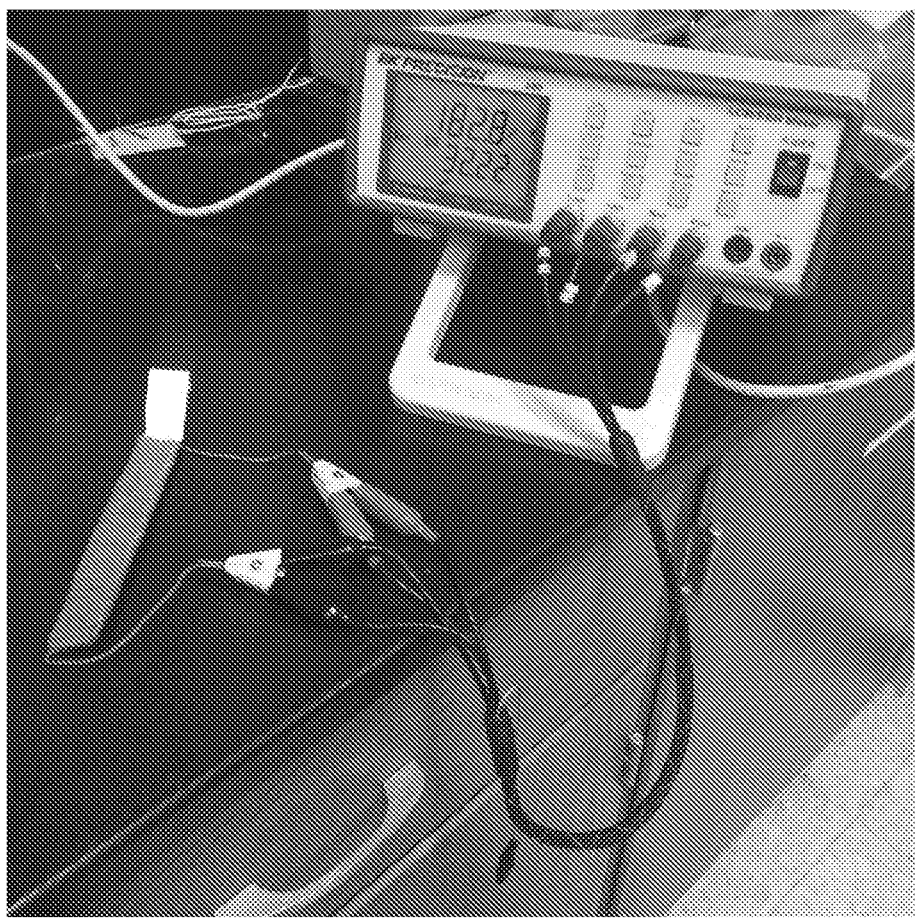
FIG. 21 shows an experiment setup for measuring the sample coil inductance and resistance.

The sample coil was connected to the RLC meter, and the inductance and equivalent series resistance (ESR) of the coil was measured under the frequency of 100 kHz. The RLC meter use was a BK Precision 889 model, and the experiment setup of measuring the sample coil is shown in FIG. 21.

Once the inductance of the sample coil $L_{sample}$ was obtained, the inductance formula of long solenoid was used to calculate the permeability of the ferrite sheet. The real part of the sample permeability is given by:

$$\mu_r^{eff} = \frac{L_{sample} l_{sample}}{\mu_0 N_{sample}^2 A_{sample}}. \tag{6-3}$$

In (6-3), $l_{sample}$ is the length of the sample coil; $N_{sample}$ is the number of turns of the coil; $A_{sample}$ is the cross section area of the sample. It was assumed the sample ferrite sheet is narrow enough to approximate the coil as an infinite long solenoid, so that (6-3) is accurate enough to estimate the material permeability. The imaginary part of the permeability is estimated using the equivalent series resistance (ESR) of the coil. The ESR of the coil is contributed by both copper resistance and the magnetic loss tangent. The copper resistance is related to current frequency due to the proximity effect. For single layer coil, the AC resistance of the copper wire can be calculated as $$R_{ac}^{wire} = R_{dc}^{wire} A \left[ \frac{\sinh(2A) + \sin(2A)}{\cosh(2A) - \cos(2A)} \right], \text{ and} \tag{6-4}$$

$$A = \left(\frac{\pi}{4}\right)^{3/4} \frac{d^{3/2}}{\delta t^{1/2}}. \tag{6-5}$$

In (6-5), d is the wire diameter and t is the distance between each turns. δ is the skin depth under a certain frequency. $R_{dc}^{wire}$ is the DC resistance of the copper wire and can be directly measured using RLC meter. Then, the ESR contributed by the magnetic loss tangent can be calibrated as $$R_m = R_{sample} - R_{ac}^{wire}. \tag{6-6}$$

Then the imaginary part of the material permeability is calculated as $$\mu_i^{eff} = \frac{R_m l_{sample}}{2\pi f \mu_0 N_{sample}^2 A_{sample}}. \tag{6-7}$$

In (6-7), f is the frequency under which the resistance and inductance of the sample coil is measured. In the following table, we show the measured data relevant to the above analysis and the final results of the permeability of the material (which is shown in bold font numbers).

TABLE 2

Measurement Results of the Sample Ferrite Sheet.

| Parameter (unit) | Value |
| --- | --- |
| f (kHz) | 100 |
| $l_{sample}$ (mm) | 145 |
| $A_{sample}$ (mm$^2$) | 6 |
| $L_{sample}$ (uH) | 153.3 |
| $R_{sample}$ (Ohms) | 25.97 |
| $R_{wire}^{dc}$ (Ohms) | 0.333 |
| d (mm) | 0.59 |
| t (mm) | 1.31 |
| δ (mm) | 0.206 |
| $R_{wire}^{ac}$ (Ohms) | 0.49 |
| $R_m$ (Ohms) | 25.5 |
| $\mu_r^{eff}$ | 538 |
| $\mu_i^{eff}$ | 145 |

The thickness of the ferrite sheet product is 0.3 mm but the actual magnetic layer inside the sheet is only 0.02 mm thick. Therefore, the permeability measured in this section is the effective permeability of the ferrite sheet, and that is to say, the average value of the permeability. The overall thickness and the average permeability of the material were directly applied to FEM simulation and the results were used to compare with the experiment data.

Ferrite Layer on Ferromagnetic Pipe

Figure 22:
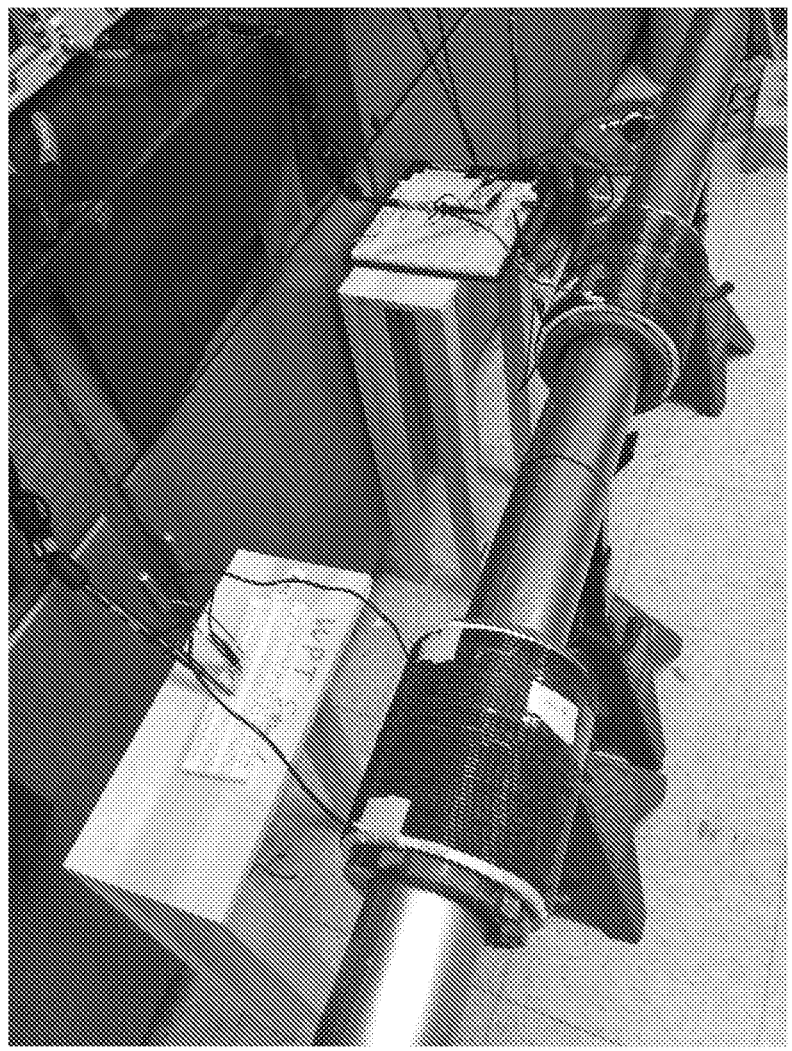
FIG. 22 shows an experiment setup for wireless power transfer on ferromagnetic pipe.

In this section, a wireless power transfer model was built along a ferromagnetic pipe. The pipe was covered with a ferrite layer and ferrite cores were added to the transmitting and the receiving coils. The conductivity and the permeability of the ferromagnetic pipe were unknown, but estimations are given. The conductivity of the pipe was assumed to be 1.1×10$^6$ S/m and the relative permeability of the pipe was assumed to be 100. The estimated parameter value was applied to the FEM simulation and the results were compared with the experiment. The experiment setup of the wireless power transfer system along the ferromagnetic pipe is shown in FIG. 22.

Figure 23:
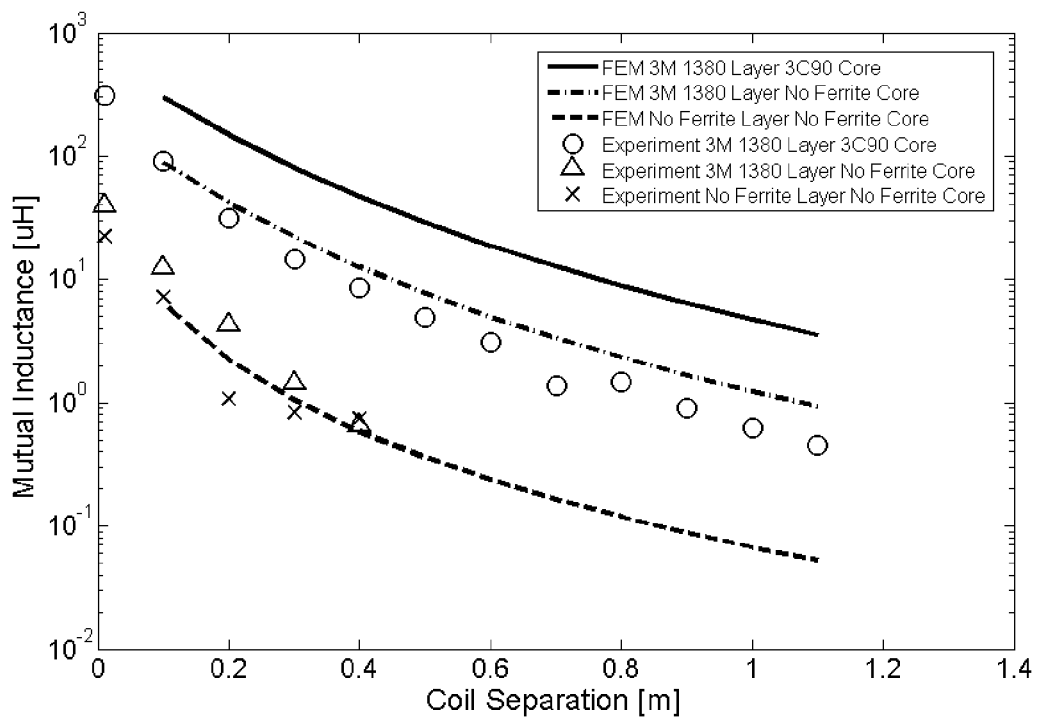
FIG. 23 shows experiment and simulation results of mutual inductance with 3M 1380 ferrite layer on pipe and the 3C90 ferrite cores on coils at 100 kHz.

The mutual inductance of the system was measured and compared to the data with FEM simulation results. Also, the 3C90 ferrite core and 3M 1380 ferrite sheet were removed from the system to see if the ferrite material does improve the magnetic coupling and power transfer efficiency. The experiment and simulation results of mutual inductance are given in FIG. 23.

Figure 24:
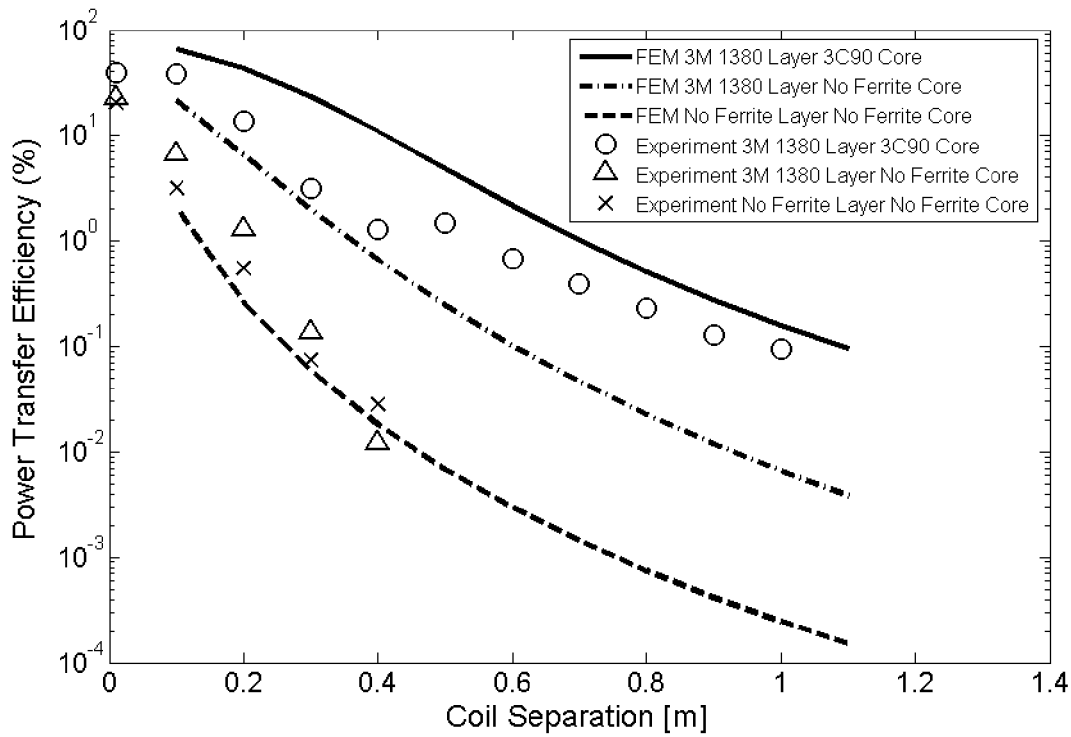
FIG. 24 shows experiment and simulation results of power transfer efficiency with 3M 1380 ferrite layer on pipe and 3C90 ferrite cores on coils.

Due to the fact that the conductivity and the permeability of the metal pipe is unknown, it is difficult for the simulation results to completely agree with experiment. However, it can be seen that the mutual inductance results of coils on bare pipe agree with the experiment. This might also indicate that the measured permeability of 3M 1380 ferrite sheet might not be accurate enough as well. Also, the power transfer efficiency of the system was measured and compared to the data with simulation, which is shown in FIG. 24.

There are several possible reasons resulting in the inconsistency of the simulation and the experiment results. The permeability and conductivity of the metal pipe is unknown, and the input power on the primary coil is not large enough to induce relatively high voltage on the secondary coil that could overcome the noise. The permeability of the 3M 1380 sheet was measure with hand-winded coils, which also might add error to the FEM modeling. Still, it can be seen from both experiment and simulation that ferrite materials added to the system improves the power transfer efficiency.

Ferrite Layer on Non-Magnetic Pipe

Figure 25:
FIG. 25 shows experiment setup for wireless power transfer on the non-magnetic metal pipe.

In this section, the wireless power transfer system was built on the non-magnetic pipes in the lab, and the mutual inductance and power transfer efficiency was measured to compare with FEM simulation results. The experiment setup of wireless power transfer system on the non-magnetic pipe is shown in FIG. 25.

Figure 26:
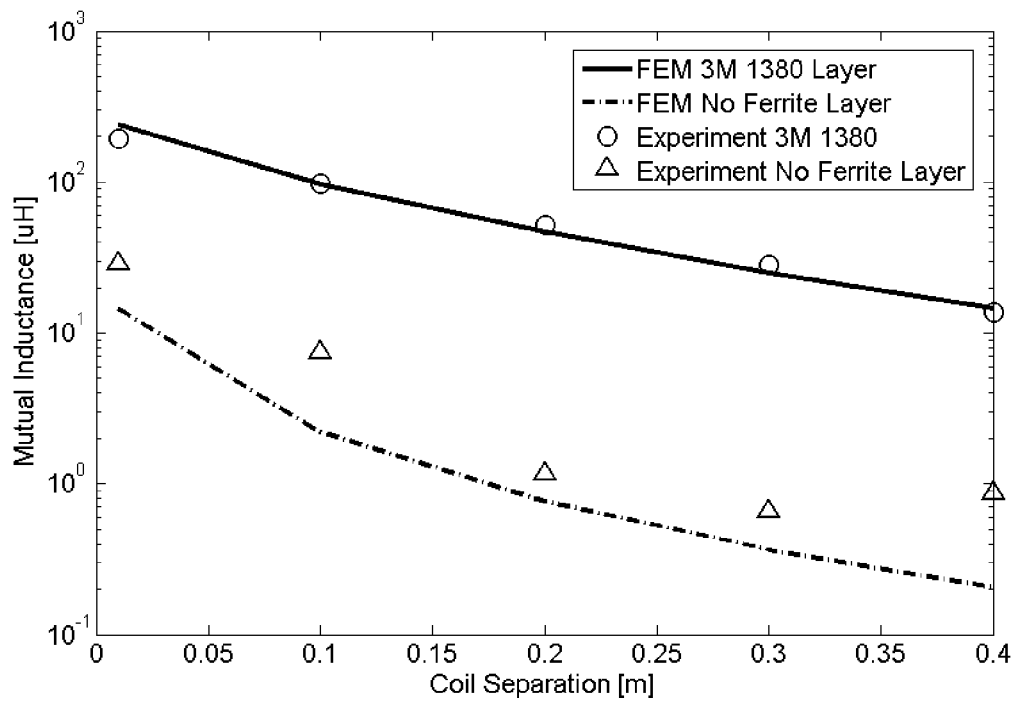
FIG. 26 shows experiment and simulation results of mutual inductance on non-magnetic pipe with 3M 1380 ferrite layer.

This experiment setup is actually the same as discussed previously, but a 3M 1380 ferrite sheet was added on the pipe to enhance the magnetic coupling. The outer diameter of the non-magnetic pipe available in lab is larger than the inner diameter of the 3C90 ferrite core. So it was impossible to install ferrite cores on the coils. Therefore in this section, only the improvement brought by the 3M 1380 ferrite sheet is explored. The experiment and simulation results of the mutual inductance are given in FIG. 26.

Figure 27:
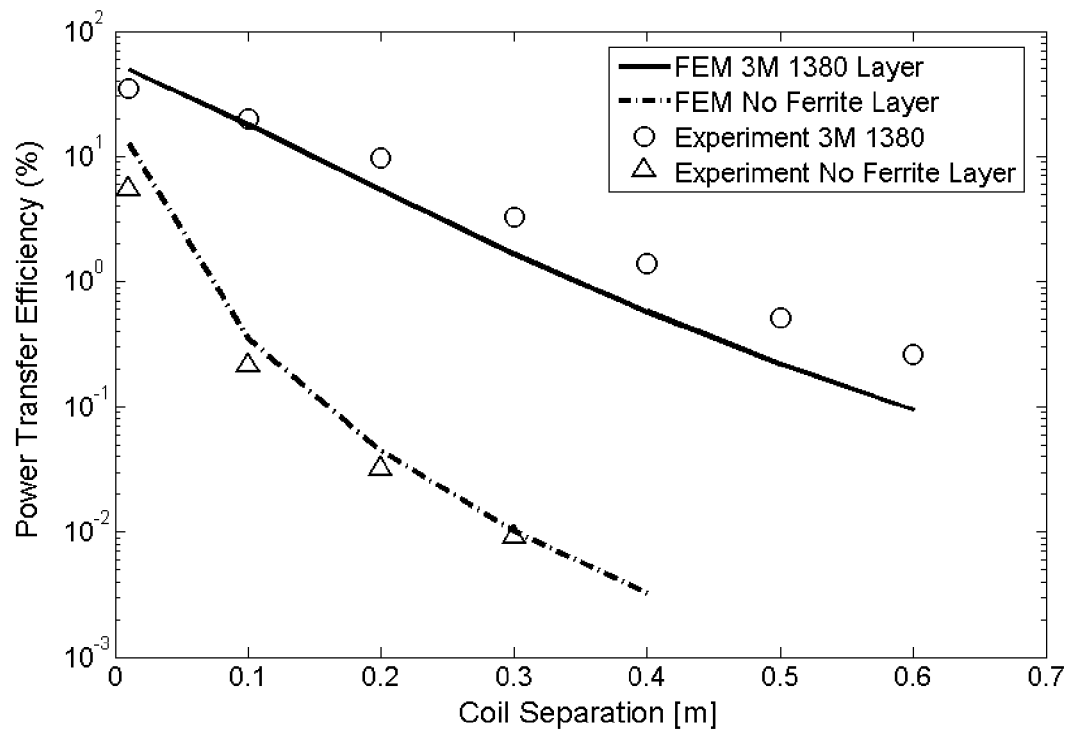
FIG. 27 shows experiment and simulation results of power transfer efficiency on the non-magnetic pipe with 3M 1380 ferrite layer at 10 kHz.

A better agreement between FEM simulation and experiment was seen in this case. The result indicates that the experiment measurement of the 3M 1380 ferrite permeability is accurate enough to predict the mutual inductance. The experiment results of mutual inductance on the bare non-magnetic pipe are slightly off from the simulation data, and this is probably due to the fact that the input power to the primary coil is small and the induced voltage on the secondary coil is affected by noise. The power transfer efficiency was also measured and compared to the results with FEM simulation, which is shown in FIG. 27.

Better agreement on power transfer efficiency was also seen. The magnetic loss tangent of the 3M 1380 is relatively high (about 0.27), such high loss tangent will add input resistance to the coils and reduce the power transfer efficiency. Therefore in FIG. 27, the operation frequency to 10 kHz was lowered to reduce the loss effect. At 10 kHz frequency, it can be see nthat the ferrite layer on the nonmagnetic pipe enhance the magnetic coupling and increase the power transfer efficiency greatly.

Embodiments described herein are included to demonstrate particular aspects of the present disclosure. It should be appreciated by those of skill in the art that the embodiments described herein merely represent exemplary embodiments of the disclosure. Those of ordinary skill in the art should, in light of the present disclosure, appreciate that many changes can be made in the specific embodiments described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure.

What is claimed is:

1. A wireless power transfer system, the system comprising:
   a pipe in a downhole well;
   a ferrite layer positioned on the pipe;
   a transmitter coil delivering power, wherein the transmitter coil is positioned around the pipe and the ferrite layer in an upper region;
   a receiver coil wirelessly receiving power from the transmitter coil, wherein the receiver coil is positioned around the pipe and the ferrite layer in a lower region, wherein the ferrite layer acts as a magnetic flux pathway to link the transmitter and receiver coil wirelessly;
   a tool section separating the upper region and the lower region, wherein the pipe provides a downhole tool in the tool section;
   a first ferrite core positioned annularly between the transmitter coil and the ferrite layer; and
   a second ferrite core positioned annularly between the receiving coil and the ferrite layer, wherein $D_g$ represents a distance of a gap in the ferrite layer between the transmitter coil and the receiver coil, $D_c$ represents a coil separation between the transmitter coil and the receiver coil, and the gap $D_g$ is less than 80% the coil separation $D_c$.

2. The system of claim 1, wherein the ferrite layer is continuous along the pipe between transmitting and receiving coils.

3. The system of claim 1, wherein the transmitter coil, the receiver coil, the first ferrite core, and/or the second ferrite core are sealed inside an insulated structure.

4. The system of claim 1, wherein the ferrite layer is absent from the tool section.

5. The system of claim 1, wherein the ferrite layer spans the tool section to be continuous from the upper region to the lower region.

6. The system of claim 1, wherein the downhole tool is a packer.

7. The system of claim 1, wherein a thickness of the ferrite layer is 0.3 mm or greater.

8. The system of claim 1, wherein the coil separation $D_c$ is equal to or between 1-3 meters.

9. A method for wireless power transfer, the method comprising:
   positioning a ferrite layer on a pipe;
   positioning a receiver coil around the pipe and the ferrite layer in a lower region;
   positioning a transmitter coil around the pipe and the ferrite layer in an upper region, wherein
   the ferrite layer acts as a magnetic flux pathway to link the transmitter and receiver coil wirelessly,
   wherein further the pipe includes a tool section separating the upper region and the lower region,
   wherein the pipe provides a downhole tool in the tool section;
   positioning a first ferrite core annularly between the transmitter coil and the ferrite layer;
   positioning a second ferrite core annularly between the receiving coil and the ferrite layer;
   positioning the pipe in a downhole well;
   providing power to the transmitter coil; and
   wirelessly receiving the power from the transmitter coil with the receiver coil, wherein $D_g$ represents a distance of a gap in the ferrite layer between the transmitter coil and the receiver coil, and the gap $D_g$ is less than 80% a coil separation $D_c$.

10. The method of claim 9, wherein the ferrite layer is continuous along the pipe.

11. The method of claim 9 further comprising sealing the transmitter coil, the receiver coil, the first ferrite core, and/or the second ferrite core inside an insulated structure.

12. The system of claim 9, wherein the ferrite layer is absent from the tool section.

13. The system of claim 9, wherein the ferrite layer spans the tool section to be continuous from the upper region to the lower region.

14. The system of claim 9, wherein the downhole tool is a packer.

15. The method of claim 9, wherein a thickness of the ferrite layer is 0.3 mm or greater.

16. The method of claim 12, wherein the coil separation $D_c$ is equal to or between 1-3 meters.

* * * * *